(12) United States Patent
Buchmann et al.

(10) Patent No.: US 8,149,979 B2
(45) Date of Patent: Apr. 3, 2012

(54) METHOD AND APPARATUS FOR HANDLING OF CLOCK INFORMATION IN SERIAL LINK PORTS

(75) Inventors: Peter Buchmann, Wald (CH); Martin Leo Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 12/547,342

(22) Filed: Aug. 25, 2009

(65) Prior Publication Data
US 2010/0061497 A1 Mar. 11, 2010

Related U.S. Application Data

(63) Continuation of application No. 11/484,406, filed on Jul. 11, 2006, now Pat. No. 7,684,534.

(30) Foreign Application Priority Data

Jul. 11, 2005 (EP) ..................................... 05015016

(51) Int. Cl.
*H04L 7/00* (2006.01)
(52) U.S. Cl. ........ 375/371; 375/316; 375/354; 375/355; 375/357; 375/373; 375/375; 713/503; 713/600
(58) Field of Classification Search .................. 375/316, 375/354, 355, 357, 375, 371; 713/503, 600
See application file for complete search history.

(56) References Cited

U.S. PATENT DOCUMENTS

| | | | |
|---|---|---|---|
| 5,832,047 A | 11/1998 | Ferraiolo | |
| 6,255,866 B1 | 7/2001 | Wolaver et al. | 327/107 |
| 6,334,163 B1 | 12/2001 | Dreps | |
| 7,158,587 B2 | 1/2007 | Yang et al. | 375/327 |
| 7,254,797 B2 | 8/2007 | Garlepp | 716/10 |
| 2002/0196889 A1* | 12/2002 | Tamura et al. | 375/373 |
| 2004/0208270 A1 | 10/2004 | Schmatz | |
| 2004/0218705 A1 | 11/2004 | Cranford | |
| 2005/0212580 A1* | 9/2005 | Johnson | 327/295 |
| 2006/0008041 A1* | 1/2006 | Kim et al. | 375/371 |
| 2006/0045224 A1* | 3/2006 | Cranford et al. | 375/355 |
| 2006/0140318 A1* | 6/2006 | Farjad-rad | 375/355 |
| 2007/0147566 A1* | 6/2007 | Laturell et al. | 375/355 |

OTHER PUBLICATIONS

Wei, "A variable-frequency parallel I/O interface with adaptive power-supply regulation", IEEE Journal of solid-state circuits, vol. 35, No. 11, Nov. 2000, p. 1600-1610.

(Continued)

*Primary Examiner* — Siu Lee

(74) *Attorney, Agent, or Firm* — William Stock; Anne Vachon Dougherty

(57) ABSTRACT

A receiver for a serial link port that is enhanced by a clock-data-recovery loop connected to the forwarded clock signal lane. The receiver includes a phase interpolation means controlled by a phase position logic which gets its update signal from local phase update signals of the clock-data-recovery loop via a digital low pass filter. The receiver also provides a global phase update source selection logic to control which clock-data-recovery loop is distributing phase update information, and which clock-data-recovery loop is receiving phase update information based on the clock analysis block.

19 Claims, 7 Drawing Sheets

OTHER PUBLICATIONS

Sidiropoulo, et al, A Semidigital Dual Delay-Locked Loop, IEEE Journal of solid-state circuits, vol. 32, No. 11, Nov. 1997, p. 1683-1692.

Chakraborty, "Introduction to the sysHSI Block ispXPGA and ispGDX2"; Aug. 2003; "Efficient Self-Timed Interfaces for Crossing Clock Domains" University of British Columbia.

Söderquist, "Globally Updated Mesochronous Design Style GUM-design-style", Proceedings of the 28th European Solid-State Circuits Conference, Sep. 24-26, 2002, Florence.

Application Note 130 "CDR in Mercury Devices", Altera Corporation, Feb. 2001.

* cited by examiner

METHOD AND APPARATUS FOR HANDLING OF CLOCK INFORMATION IN SERIAL LINK PORTS

CROSS REFERENCE TO RELATED APPLICATIONS

This is a Continuation of U.S. application Ser. No. 11/484,406 filed Jul. 11, 2006, now U.S. Pat. No. 7,684,534 which issued on March 23, 2010.

TECHNICAL FIELD

The present invention relates to handling of clock information in serial link ports. In particular, it relates to latency reduction, increase of reliability and/or out-of-band information signaling in serial ports.

BACKGROUND OF THE INVENTION

Clock-data-recovery, also known as CDR, loops in serial data transmission links measure the position of the transition between logic states one-to-zero, zero-to-one, or multilevel-transitions and use a control loop to dynamically adjust the phase of the data sampling clock to an optimum position for minimum errors. This requires high-speed sampling latches in the receiver front end, a high-speed phase detection logic function, the appropriate clock generation building blocks, and a means to adjust the phase of the clock. In Gu-Yeon Wei, Jaeha Kim, Dean Liu, Stefanos Sidiropoulos, and Mark A. Horowitz, "A variable-frequency parallel I/O interface with adaptive power-supply regulation", IEEE Journal of solid-state circuits, vol. 35, no. 11, November 2000, p. 1600-1610, and in Stefanos Sidiropoulos, Mark A. Horowitz, "A Semi-digital Dual Delay-Locked Loop", IEEE Journal of solid-state circuits, vol. 32, no. 11, November 1997, p. 1683-1692, phase adjustment loops according to the above description are depicted. US2004/0218705A1 gives a detailed description of a CDR system with digital phase adjustment.

It has to be noted that the adjustment of the clock phase as outlined above is controlled by a digital signal. This digital signal inherently carries information about the dynamic phase difference between the reference signal and the data signal. The reason for this is that the CDR control loop operates to minimize the phase difference between clock and data phase as it is detected by the high-speed phase detection logic function—the error signal in the loop is therefore an equivalent representation of the phase difference between clock and data, and the digital block controlling the phase of the clock is holding the phase value.

There are systems where only one serial link is used to connect transmitter and receiver. An extension of these systems can be achieved when two or more serial links are bundled to form a serial port to achieve higher aggregate data throughput. One advantage of this approach lies in the fact that the instantaneous phases of all data lanes in a port are highly correlated because the same clock signal is used in the transmitter to launch all the data signals. An example for such a system is described in the IEEE 802.3ae XAUI standard.

To further extend the concept of a serial port, an additional signal containing information about the clock can be forwarded from the transmitter to the receiver in the form of a dedicated clock lane. This signal is called the 'forwarded clock signal' and its instantaneous phase is again highly correlated to the instantaneous phases of all data lanes and vice versa. An example for such a system with a forwarded clock signal is described in the HyperTransport standard or the OIF SFI5 standard. It should be noted that those applications feature a full-duplex signaling scheme where two serial ports are connected between two chips in opposite direction, one south-bound and one north-bound.

The phase correlation can be exploited in the receiver when sharing phase update information between the individual channels, in particular sharing the phase information of the forwarded clock signal with the individual data lanes of a serial port. The phase information inherently present in the forwarded clock signal can therefore be used to replace a standalone receiver clock generator to generate the base signal for the data sampling clocks by means of a clock buffer driven by the forwarded clock signal, a Phase Locked Loop, PLL, with a reference frequency derived from the forwarded clock signal, or Delay Locked Loop, DLL, with its input signal derived from the forwarded clock signal.

A benefit of using the forwarded clock signal to act as the clock generation unit in the receiver is that the individual CDR loops of the data lanes can be implemented with reduced bandwidth and therefore power and/or first chip area, because most of the phase uncertainty is eliminated by leveraging the phase correlation between data and clock. In particular, the individual CDR loops could operate only periodically to save power.

The phase of the recovered data from each lane in the serial port is referenced to the recovered clock signal. In general, the recovered data is transferred to a digital core where the information contained in the data signals is processed. For this, the phase of the data signals has to be aligned with the clock of the digital core. This is achieved by means of a synchronizer consisting typically of a First-In-First-Out, FIFO, buffer with separate write and read addresses. The separate write and read addresses enables the FIFO to accept data from one side to be written at a given position write address, and to write data to the output of the FIFO depending on the read address. The distance of the write and read address has to be larger than the maximum phase difference between the clock of the recovered data and the clock of the digital core to avoid non-causal behavior e.g. reading data before it is written. A control loop can be added to ensure the appropriate update of the read and write addresses to achieve a relatively improved performance.

Three problems are associated with this traditional approach. First, the recovered data on the receiver chip has to be passed to the digital core functionality of that chip where it is actually processed. However, due to the fact that the phase of the recovered data is dynamically adjusted in the CDR loop to achieve minimum errors, there is a dynamic phase difference between the recovered data and the core clock of the chip. To compensate for this difference, a synchronizer circuit is used to add phase elasticity between the output of the CDR and the input of the core logic as described above. The larger the dynamic phase uncertainty between the recovered data clock and the core clock, the more stages have to be added to the FIFO in the synchronizer. This increases the latency of the transmission system which is particularly problematic for interconnect systems over short distances and for latency critical links as found in memory applications. Second, the use of the forwarded clock signal in the function of the receiver clock generator has the disadvantage of introducing a single point of failure. When the clock signal is not arriving at the receiver, for example because a connector in the transmission channel has oxidized, the entire receiver will stop functioning due to lack of a proper clock. This is particularly negative in systems with high reliability requirements. A spare lane is typically added for systems with such high reliability requirements, and a high-frequency analog switch is added to the front end to route the clock to the spare lane. High-frequency switching is a demanding task because of the associated parasitic capacitive loading of the lanes and the jitter penalty associated with the programmable routing. Third, because the forwarded clock signal is required to be a continuous signal, the transmission of any additional information via that reserved lane, other than the phase information, is denied. In particular, it is not possible to use that lane for out-of-band signaling of status information or for signaling of equalization settings. It is also very difficult to assess the quality of the clock signal. However, not knowing the clock quality leads to the situation where unscheduled downtime of the system is highly probable. To ensure high quality clock signals, special care can be applied to the routing of the clock signal, for example to avoid unwanted cross talk signal injections. However, this complicates the board design and, in the case of a failover mode when the clock is transmitted over a data lane, the specific layout is no longer present.

US Patent Publication number 2004/0208270A1 describes a method to generate, distribute and share the phase update information of one or many CDR loops with one or many other CDR loops and it describes a method for a clock generator whose phase is controlled via said shared phase information. In contrast to the setup described in the previous section where the correlation information was distributed in the form of an analog signal, systems such as the one detailed in 2004/0208270A1 distribute the correlation information in digital signal form. The advantage of this approach is that the digital signals are not prone to any noise or drift due to their quantized nature. It is also the case that the digital phase information can be distributed at a fraction of the frequency of the high-speed forwarded clock signals, thereby reducing complexity, power and first chip area.

FIG. 1a illustrates a serial link system according to the prior art formed by a full-duplex configuration of two serial link ports between a first chip 101 having a core 103 and a second chip 102 having a core 104. The second chip 102 includes a serial transmitter port 105 connected via a plurality of data lanes 107 and a clock lane 108 to the receiver serial link port 106 on the first chip 101. Similarly, the first chip 101 includes a serial transmitter port 105 connected via a plurality of data lanes 107 and a clock lane 108 to the receiver serial link port 106 on the second chip 101. The first and second chip are synchronized by distribution of a first reference clock signal 110 to first chip 101 and a second reference clock signal 111 to second chip 102. The first and second reference clock signals 110 111 originate from a reference clock generator 109. The reference signals 110 111 may have the same frequency, but with variable instantaneous phases. They may have a rational number ratio between their frequencies, and they may be generated by different independent sources. Such a configuration might be found for example in multi-processor applications where two processors exchange information. U.S. Pat. No. 6,334,163 and 5,832,047 describe such serial link systems and the HyperTransport consortium has specified such a serial link system in the HyperTransport standards.

The serial links as depicted in FIG. 1a can be modified to implement a unidirectional serial link system or a daisy chained serial link system as depicted in FIG. 1b and FIG. 1c. These and other similar configurations are outlined in the HyperTransport standards as published by the HyperTransport consortium. FIG. 1b for example illustrates a block diagram of such a unidirectional serial data transmission system from a first chip 101 to a second chip 102. The first chip 101 includes a serial transmitter port 105 connected via a plurality of data lanes 107 and a clock lane 108 to the receiver serial link port 106 on the second chip 101. The two chips are synchronized by distribution of a first reference clock signal 110 to the first chip 101 and a second reference clock signal 111 to the second chip 102, both reference signals originating from a reference clock generator 109. Such a configuration might be found for example in a switch chip where information is flowing through a chip in one direction only. FIG. 1c illustrates a similar system as depicted in FIG. 1a, but enhanced according to the prior art to form a daisy chain serial port between a first chip 101 having a core 103, and second chip 102 having a core 104. A receiver serial link port 106 on the first chip 101 receives data on a plurality of data lanes 107 and information on a clock lane 108 from an upstream device, not shown. A transmitter serial link port 105 is connected via a plurality of data lanes 107 and a clock lane 108 to the respective receiver serial link port 106 on the second chip 102. A transmitter serial link port 105 on the second chip 102 transmits data and clock data to a downstream device, not shown. The two chips are synchronized by distribution of a first reference clock signal 110 to first chip 101 and a second reference clock signal 111 to second chip 102, both reference signals originating from a reference clock generator 109. The reference signals 110 111 may have the same frequency, but with variable instantaneous phases. They may have a rational number ratio between their frequencies, and they can be generated by different independent sources. Such a configuration might be found for example in memory buffer applications one memory buffer is transferring data from upstream memory buffers to memory buffers downstream. Example for such a system is shown in the JEDEC Fully Buffered DIMM standard.

FIG. 2 illustrates a receiver according to the prior art. A plurality of data lanes 107 and a forwarded clock signal lane 108 are incident to the receiver of the serial port. A clock failover mode switch logic 201 is controlling a multiplexer 202 via a control signal 232 and gets its trigger signal 208 from a analog clock quality analysis block 207. The output signal 204 of the multiplexer 202 is fed to a clock buffer 205 which can comprise a PLL. The analog clock quality analysis block 207 analyses the quality of the clock signal 204 and can also be fed by the buffered clock signal 225 via a second path 206. The output of the clock buffer 205 is fed into a plurality of CDR loops 212 which are connected to each of the incoming data lanes 107. The CDR loop comprises a data receiver frontend 211, a CDR logic 213, a phase position logic 210 and a phase adjuster 209 to adjust the phase of the buffered clock signal 225. The CDR logic 213 analyzes the phase difference between the input signals of the data receiver frontend 211, and minimizes this phase difference by updating the phase position logic 210 accordingly. The CDR logic feeds the recovered data signal 214 and the recovered clock signal 215 from each CDR loop 212 to a synchronizer block 216 where the dynamic phase difference between the recovered clock signals 215 and the core clock signal 224 is compensated. Each synchronizer 216 comprises a circular FIFO 217, a write/read address logic 218 and a synchronization flip-flop 219. The clock of the synchronization flip-flop 219 is derived from the core clock signal 224 which is generated in the core clock generator 222 and thereby referenced back to the external reference clock signal 223.

There may be a significant amount of dynamic phase difference between the clock path that extends from the reference clock generator 109, the reference clock distribution 110 to the transmitter 105, over the clock signal 108, through multiplexer 202, clock buffer 205, CDR loop 212 to the recovered clock signal 215 on one side, and the clock path that extends from the reference generator 109, the reference clock distribution 111, core clock generator 222 to the core clock output signal 224. There are many sources for the dynamic change of the phases in the above described paths which can include for example variations in the supply voltage affecting delays in electronic circuits, variation in the temperature affecting delays in electronic circuits, variation in the humidity affecting board impedances, noise effects affecting delays in electronic circuits. The synchronizer requires the ability to compensate for the worst case combination of all potential phase variations to guarantee a low error probability in the serial link transmission system. This is driving the requirement to add many stages to the FIFO in the synchronizer, which is directly proportional to latency introduced to the serial link transmission system. Latency prevents data from being processed quickly, and so such effects are unwanted in most serial link transmission systems. Also, more FIFO stages necessitate higher power consumption and more first chip area to implement the synchronizer.

FIG. 5 illustrates a synchronizer according to the prior art. The data from a clock-data-recovery loop 214 is fed into a receive FIFO 217 where the data is stored in the sequence of arrival. The recovered clock from the clock-data-recovery loop 215 is fed to the load address logic 501 where the address of the storage place in the FIFO is generated. An unloading address logic 504 selects one of the outputs of a multiplexer 502 and feeds this output signal 503 to a synchronization flip-flop 219. The clock signal from the core 224 is connected to both the unload address logic 504 as well as the synchronization flip-flop 219. The load address logic 501 and the unload address logic 504 are combined in a single write/read logic block 218. Similar synchronizers between two clock boundaries are disclosed in the following; Application Note 130 "CDR in Mercury Devices", Altera Corporation, February, 2001; Technical Note "Introduction to the sysHSI Block ispXPGA and ispGDX2"; Lattice Semiconductor Corporation, April, 2003; by Ajanta Chakraborty "Efficient Self-Timed Interfaces for Crossing Clock Domains—a thesis submitted to the Department of Computer Science, The University of British Columbia, August, 2003; by Ingemar Söderquist, "Globally Updated Mesochronous Design Style GUM-design-style", Proceedings of the 28th European Solid-State Circuits Conference, 24-26 Sep. 2002, Florence, Italy.

As noted above, the systems according to the state of the art require that the FIFO in the synchronizer has sufficient number of stages to handle the maximum dynamic phase variation between the recovered data clock signal and the core clock signal. Furthermore, the systems are prone to a single point of failure in that a failure in the clock path will result in failure of the entire serial port. Routing of the clock lane in order that unwanted signal injections are avoided may be difficult. Finally, the forwarded clock signal is required to be a continuous signal without the possibility to add out-of-band information transfer to this lane.

SUMMARY OF THE INVENTION

According to a first aspect of the present invention there is provided a receiver for a serial link, comprising a first clock-data-recovery loop having a digitally controlled phase adjuster to recover data and to generate information about a phase difference between an input phase and a clock phase, a clock generator having a digitally controlled second phase adjuster to adjust a phase of said clock generator, a distributor to distribute said phase difference information in digital form between said first clock-data-recovery loop and said digitally controlled phase adjuster of said clock generator, a synchronizer to transfer said recovered data to a clock domain with a clock derived from said digitally controlled phase adjuster of said clock generator.

Preferably, the receiver has one or a plurality of second clock-data-recovery loops connected to data lanes. Preferably, the receiver has at least two synchronizers, with each synchronizer connected to one of said second clock-data-recovery loops. The first clock-data-recovery loop may be connected directly or indirectly to a clock lane. At least one of the second clock-data recovery loops may be selected to act as a first clock-data recovery loop.

Preferably, more than one of said first or second clock-data recovery loops may be selected to be connected directly or indirectly to one or a plurality of clock lanes. The second clock-data-recovery loops may accept digital phase update or phase difference information from outside the second clock-data-recovery loop and/or wherein the first clock-data-recovery loops may transfer the phase difference or the phase update information from the first clock-data-recovery loops to any other element in the receiver in digital form. Further, the phase update information or the phase difference information generated in said first clock-data-recovery loops may be distributed to some or all other the second clock-data-recovery loops and/or to the second phase adjuster of the clock generator. The distributor may be one or a plurality of wires carrying digital signals, and may further comprise a digital filter connected between the first clock-data-recovery loop and the second phase adjuster of the clock generator. Alternatively, the digital filter may be connected between the first clock-data-recovery loop and all the second clock-data-recovery loops.

An output clock from the second phase adjuster of the clock generator may be used directly or indirectly to control a clock of a data transmitter and/or a clock of a digital core. Further, the digitally controlled second phase adjuster of the clock generator may be located at the output of said clock generator. The digitally controlled second phase adjuster of the clock generator may be located in a feedback loop within the clock generator. An output of the first clock-data-recovery loop may be input to a clock analyzer. The clock analyzer may determine the quality of the clock signal as recovered by first clock-data-recovery loop, and the clock signal may be a variable waveform. These variations may carry out-of-band information which may be used to signal any of status information such as a "synchronization completed" indication, a "power ok" indication,
equalization information,
signal amplitude negotiation information,
information used for link mode switching such as electrical idle indication, power-down indication, sleep mode indication.

Preferably, the output of the first clock-data-recovery loop is fed to a detector for detecting the out-of-band information, which may be used in said serial link port receiver, or forwarded directly or after processing to a data transmitter or to the digital core.

According to a second aspect of the present invention, there is provided a method for handling of clock information in a receiver of a serial link. The method comprises a recovery step for recovering data via a first clock-data-recovery loop having a digitally controlled phase adjuster, an information generation step for generating information about a phase difference between an input phase and a clock phase, an adjustment step for adjusting a phase of a clock generator having a digitally controlled second phase adjuster, a distribution step for distributing said phase difference information in digital form between said first clock-data-recovery loop and said digitally controlled phase adjuster of said clock generator, and a transferring step for transferring said recovered data to a clock domain with a clock derived from said digitally controlled phase adjuster of said clock generator.

According to a third aspect of the present invention, there is provided a serial data transmission link system having a receiver in accordance with the first aspect of the present invention.

According to a fourth aspect of the present invention, there is provided a serial data transmission link system having a plurality of lanes each having a receiver in accordance with the first aspect of the present invention.

According to a fifth aspect of the present invention, there is provided a serial data transmission link system having a plurality of data lanes plus a forwarded clock signal lane each having a receiver in accordance with the first aspect of the present invention.

According to a sixth aspect of the present invention, there is a data transmission link system in daisy chain, full-duplex, half-duplex or simultaneous bidirectional configuration combining two or more of the serial link transmission systems to transmit data between microprocessor chips.

Preferably, in case of a failure of said clock lane and/or failure of the first clock-data-recovery loop, then one of the second clock-data-recovery loops may be selected to replace the failed clock lane or the failed first clock-data-recovery loop. Further, a phase update source selection logic may control which of the second clock-data-recovery loops is selected to replace the failed clock lane or the failed first clock-data-recovery loop. The phase update source selection logic may be a finite state machine.

Advantageously, the present invention may provide phase update information gained from the analysis of the clock signal, or from one or a plurality of data signals, to a phase adjuster to adjust the phase of the clock signal which clocks the output of the synchronizer between the data receivers and the digital core. Furthermore, the dynamic phase difference between the recovered data clocks in the serial port and the clock of the digital core is minimized and enables the synchronizer to operate between data clock-data-recovery loops and digital core with minimum number of stages, thereby reducing latency.

Advantageously, the present invention may enable one or a plurality of data clock-data-recovery loops to handle a clock signal and to distribute the phase information gained from analysis of the clock signal to all other data lanes in the serial port and to a phase adjuster to adjust the phase of the core clock generator which clocks the output of the synchronizer between the data receivers and the digital core. Furthermore, by providing a method to convert any of the incident data lanes into the role of the forwarded clock signal lane using simple digital circuits, the reliability of a serial port may be enhanced without switching of analog high-speed signals. Because the phase adjuster to adjust the phase of the core clock generator is not directly connected to the incident forwarded clock signal lane, it is no longer required to apply special care to the layout of the clock lane to avoid unwanted signal injections, thereby reducing board design and manufacturing complexity.

The present invention may enable a simple assessment of the quality of the forwarded clock signal by means of digital circuitry instead of complex analog measurement circuits. Further, the present invention may enable out-of-band information signaling in the clock lane. Advantageously, the transfer of status information and/or equalization information between transmitter and receiver may be enabled without interfering with the data transfer protocol. This is equivalent to enable protocol agnostic physical link layer information exchange. For cases with a full-duplex configuration, a control loop can be formed between the receiver and transmitter where the out-of-band information transferred in the clock signal of the south-bound serial port is used as up-channel signaling from the receiver back to the transmitter of the north-bound serial port.

BRIEF DESCRIPTION OF THE DRAWINGS

The invention and its embodiments will be more fully appreciated by reference to the following detailed description of presently preferred embodiments in conjunction with the accompanying drawings, wherein.

DETAILED DESCRIPTION OF PREFERRED EMBODIMENTS OF THE INVENTION

Figure 1A:
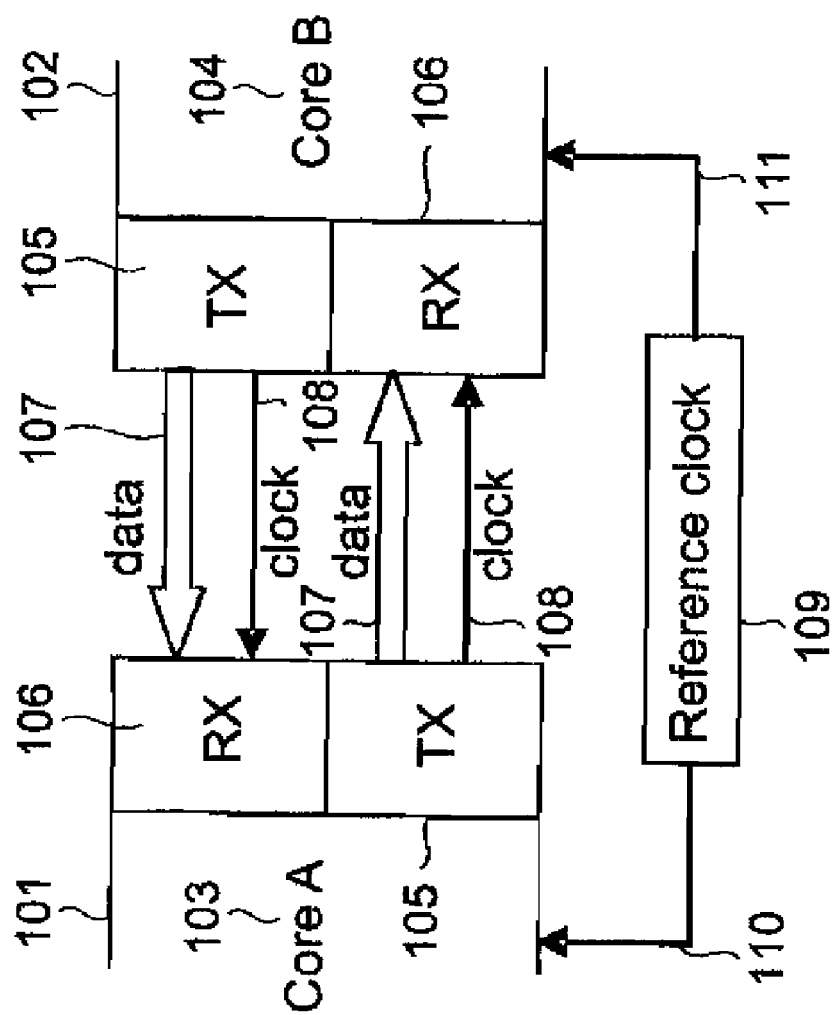
FIG. 1a illustrates a block diagram of a unidirectional serial data transmission system from first chip to second chip according to the state of the art.
Figure 1B:
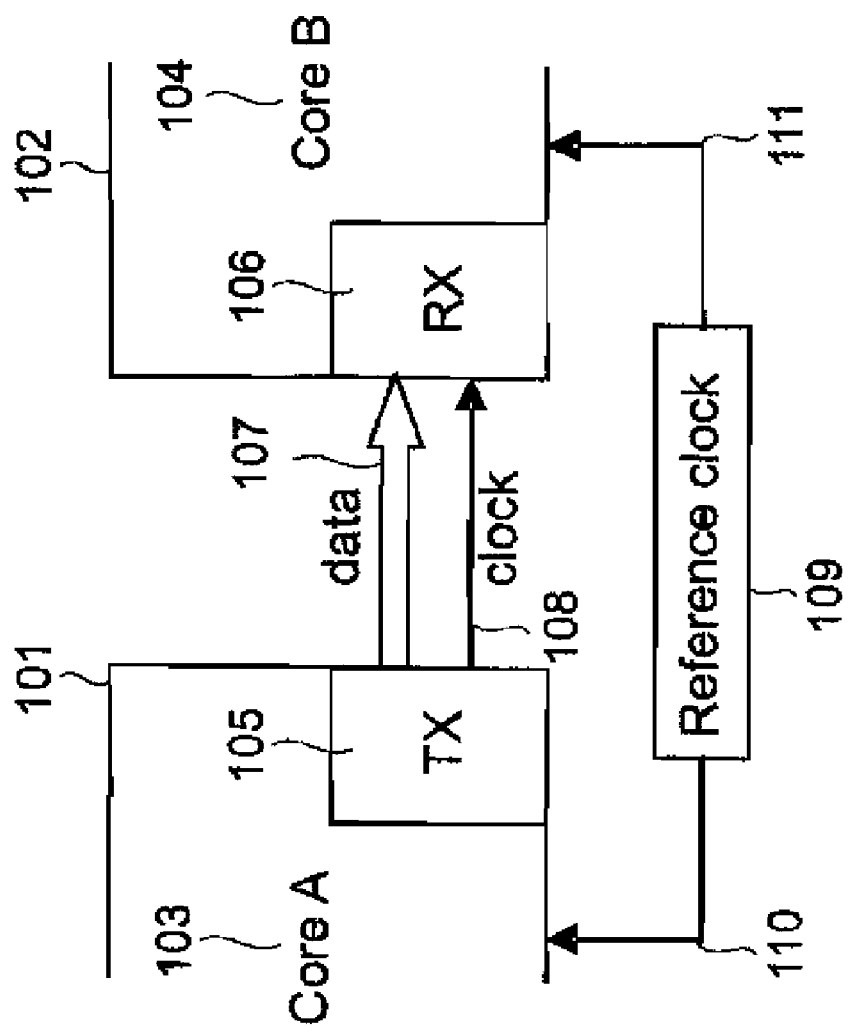
FIG. 1b illustrates a bidirectional serial transmission system from first chip to second chip according to the state of the art.
Figure 1C:
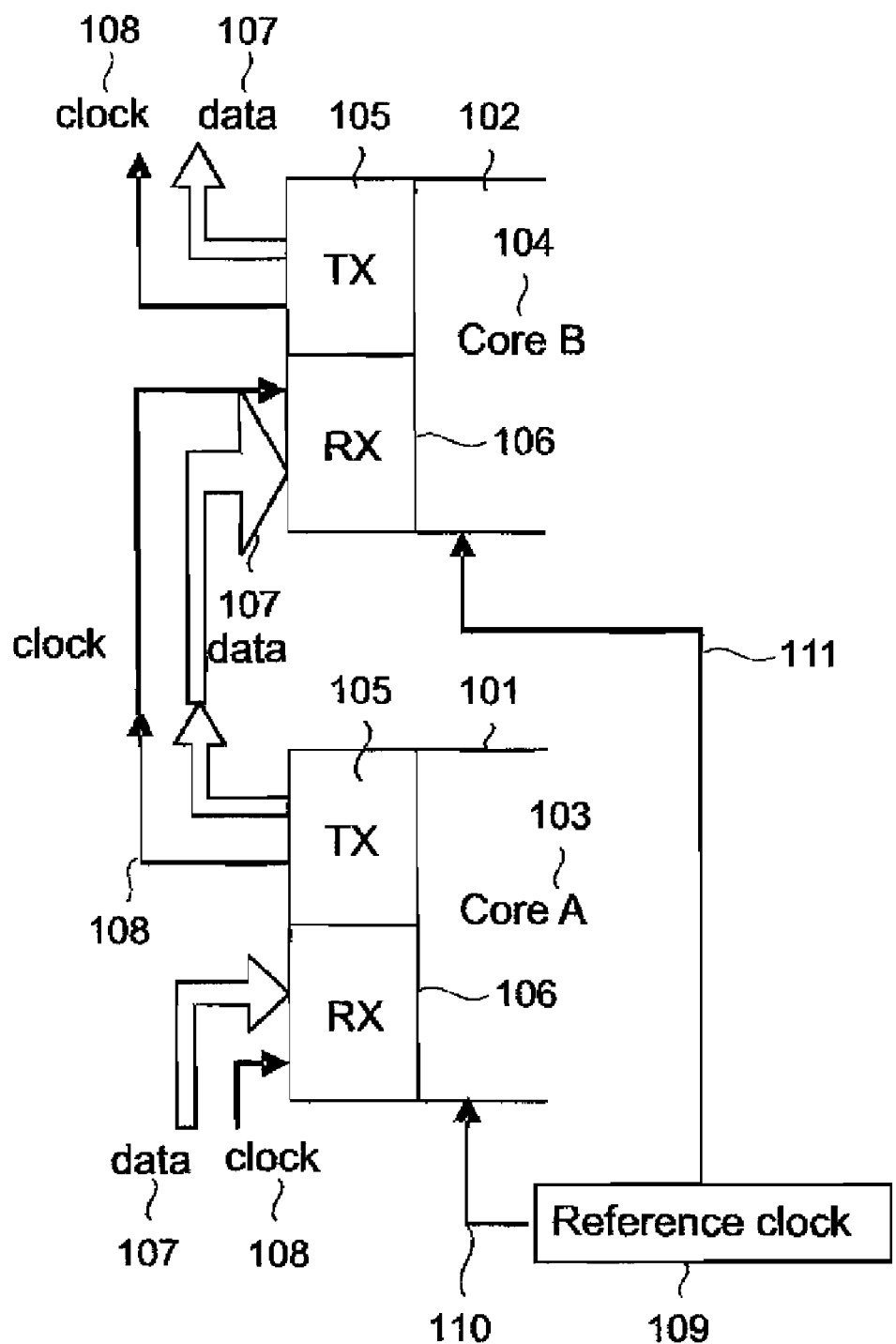
FIG. 1c illustrates a daisy chain connection in where first chip is receiving data and transfers data to second chip which is further transferring data downstream according to the state of the art. In all FIG. 1 a-c, the two chips receive a reference clock from a reference clock generator according to the state of the art.
Figure 2:
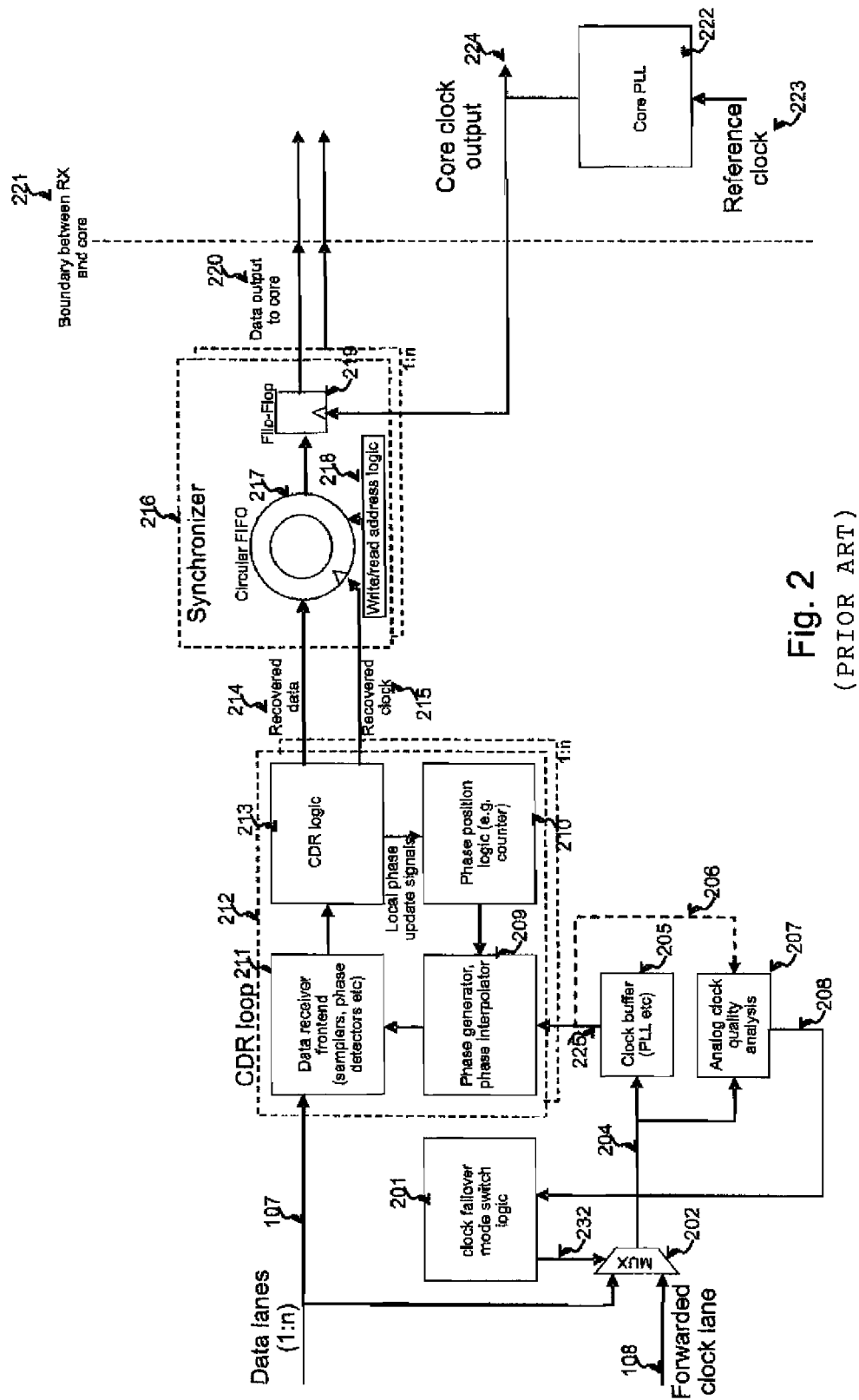
FIG. 2 illustrates a receiver for a serial link port with forwarded clock signal according to the state of the art.
Figure 3:
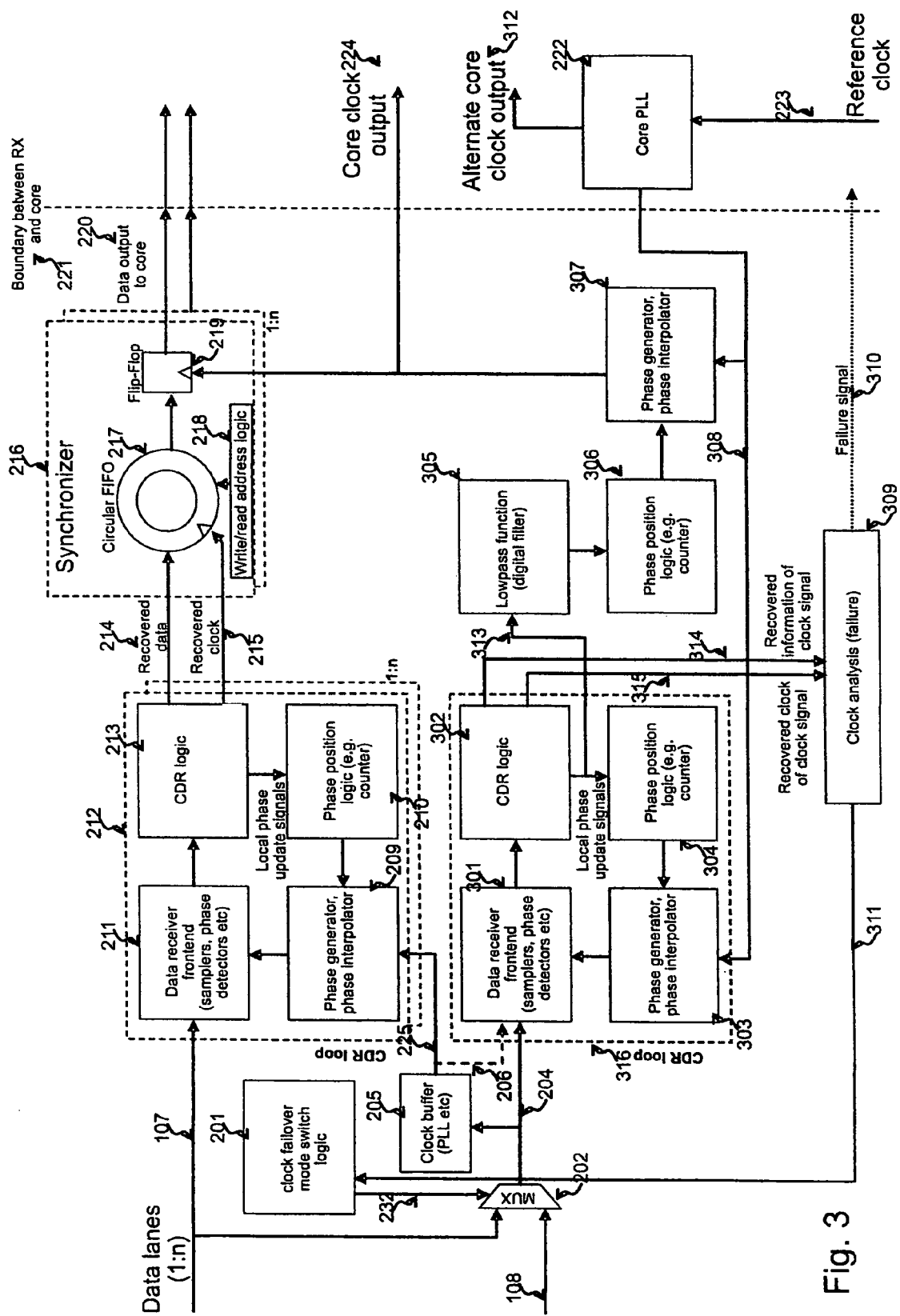
FIG. 3 illustrates a receiver for a serial link port according to the present invention that is enhanced by a clock-data-recovery loop connected to the forwarded clock signal lane, a phase interpolation means controlled by a phase position logic which gets its update signal from the local phase update signals of the clock-data-recovery loop via a digital low pass filter.

FIG. 3 illustrates a first preferred embodiment of the invention. The forwarded clock signal 108 incident to the serial link port is fed through a multiplexer 202. The output of the multiplexer 202 is fed to a clock buffer 205 whose output 225 is fed into the second CDR loops 212, also referred to as slave CDR loops. It is also fed to a first CDR loop 316, also referred to as a master CDR loop, comprising a data receiver frontend 301, a CDR logic block 302, a phase position logic 304 and a phase adjuster 303 to adjust the phase of the clock signal 308 from the core clock generator 222. The local phase update signals 313 of this clock-data-recovery loop 316 are forwarded to a digital low-pass function 305 which is controlling a phase position logic 306 to update the phases in the phase adjuster 307. This phase adjuster 307, also referred to as a digitally controlled phase adjuster, is receiving a clock signal 308 from the core clock generator 222 and shifts the phase of this signal by an amount as determined by the phase position logic 306.

With this approach according to the present invention, the output clock of the phase adjuster 307 is therefore phase locked to the phase of the incident clock lane 108 to minimize the dynamic phase variation between the core clock output signal 308 and the phase of the incident clock signal 108 to minimize the number of phase compensating stages in the FIFO 217 of a synchronizer 216, thereby substantially reducing the latency of the serial link transmission system. An alternate core clock output 312 is provided to the digital core 103 to ensure the availability of a clock signal in case of a failure of the above described function.

The recovered information of the clock signal 314 and the recovered clock of the clock signal 315 of the clock-data-recovery loop 316 which is connected to the forwarded signal lane 108 via multiplexer 202 is fed to a clock analyser 309. This block may include logic that determines that the recovered information of the clock signal 314 consists of a continuous sequence of alternating ones and zeros. If this clock analysis block detects failures in the expected sequence of alternating ones and zeros, it can signal a clock failure indication 310 to the digital core to notify a higher layer protocol of this failure. It can also indicate this failure via a control signal 311 to the clock failover mode switch logic 201 that is controlling the multiplexer 202 via control signal 232. The clock failover mode switch logic 201 can thereby feed one of the incident data lanes 107 to the input of the clock-data-recovery loop 316 so that this signal is taking over the role of the forwarded clock signal. In a preferred embodiment a higher-layer protocol would consequently rearrange its signaling scheme in a way where the selected data lane is transmitting a clock signal.

The data lanes 107 are incident to their respective clock-data-recovery loops 212. Each clock-data-recovery loop 212 comprises a data receiver frontend 211, a CDR logic 213, a phase position logic 210 and a phase adjuster 209 to adjust the phase of the buffered clock signal 225. The CDR logic 213 analyzes the phase difference between the input signals of the data receiver frontend 211, and minimizes this phase difference by updating the phase position logic 210 accordingly. The CDR logic feeds the recovered data 214 and the recovered clock 215 from each CDR loop 212 to a synchronizer block 216 where the dynamic phase difference between the recovered clocks 215 and the core clock 224 is compensated. Each synchronizer 216 comprises a circular FIFO 217, a write/read address logic 218 and a synchronization flip-flop 219. The clock of the synchronization flip-flop 219 is derived from the core clock 224 which is generated in the core clock generator 222 and shifted in the phase adjuster 307 and thereby referenced back to the external reference clock 223.

Figure 4:
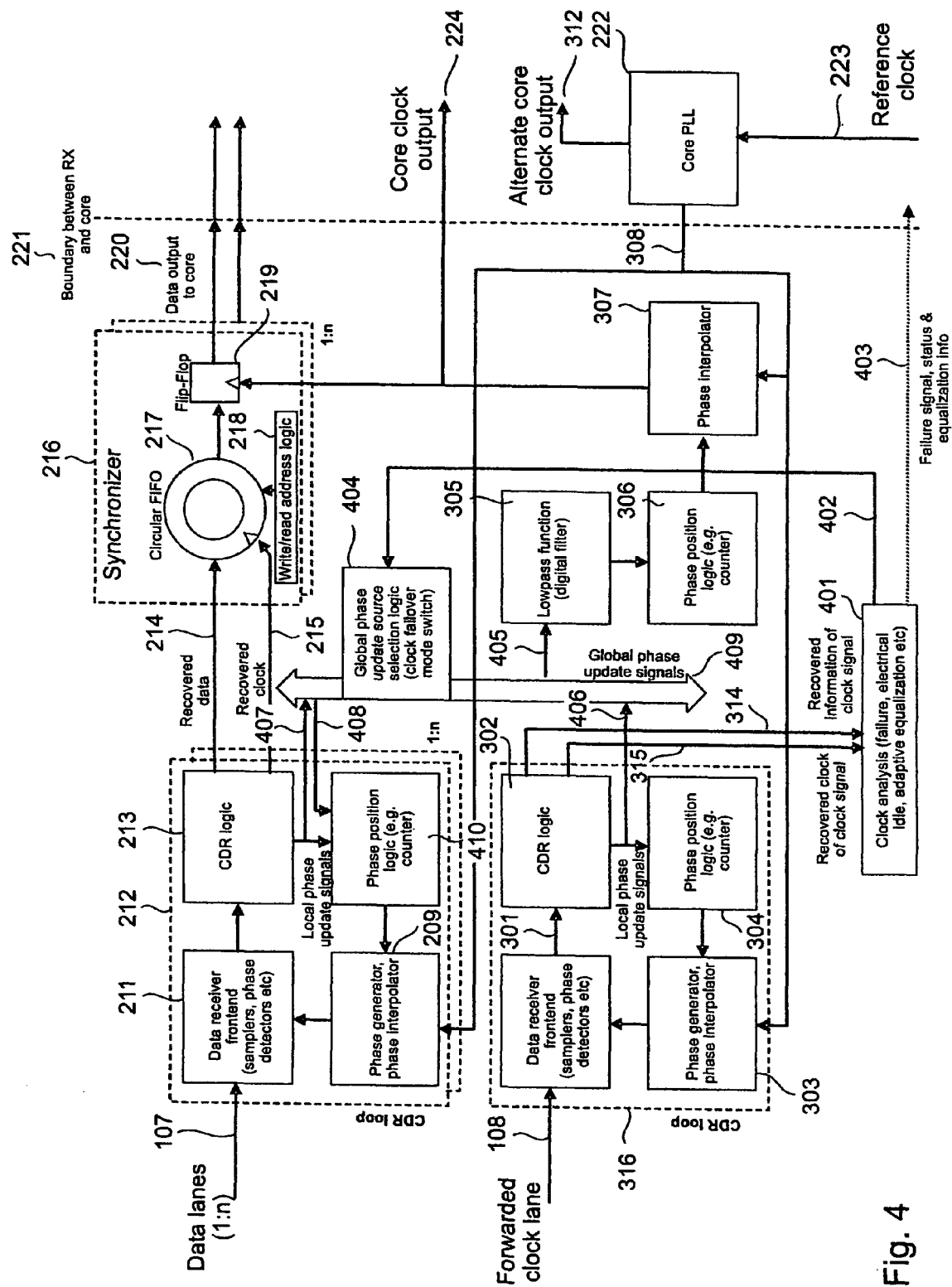
FIG. 4 illustrates a receiver for a serial link port according to the present invention that is further enhanced by a distribution of local phase update signals from the clock-data-recovery loop operating on the forwarded clock signal lane or from any of the clock-data-recovery loops operating on data lanes.
Figure 5:
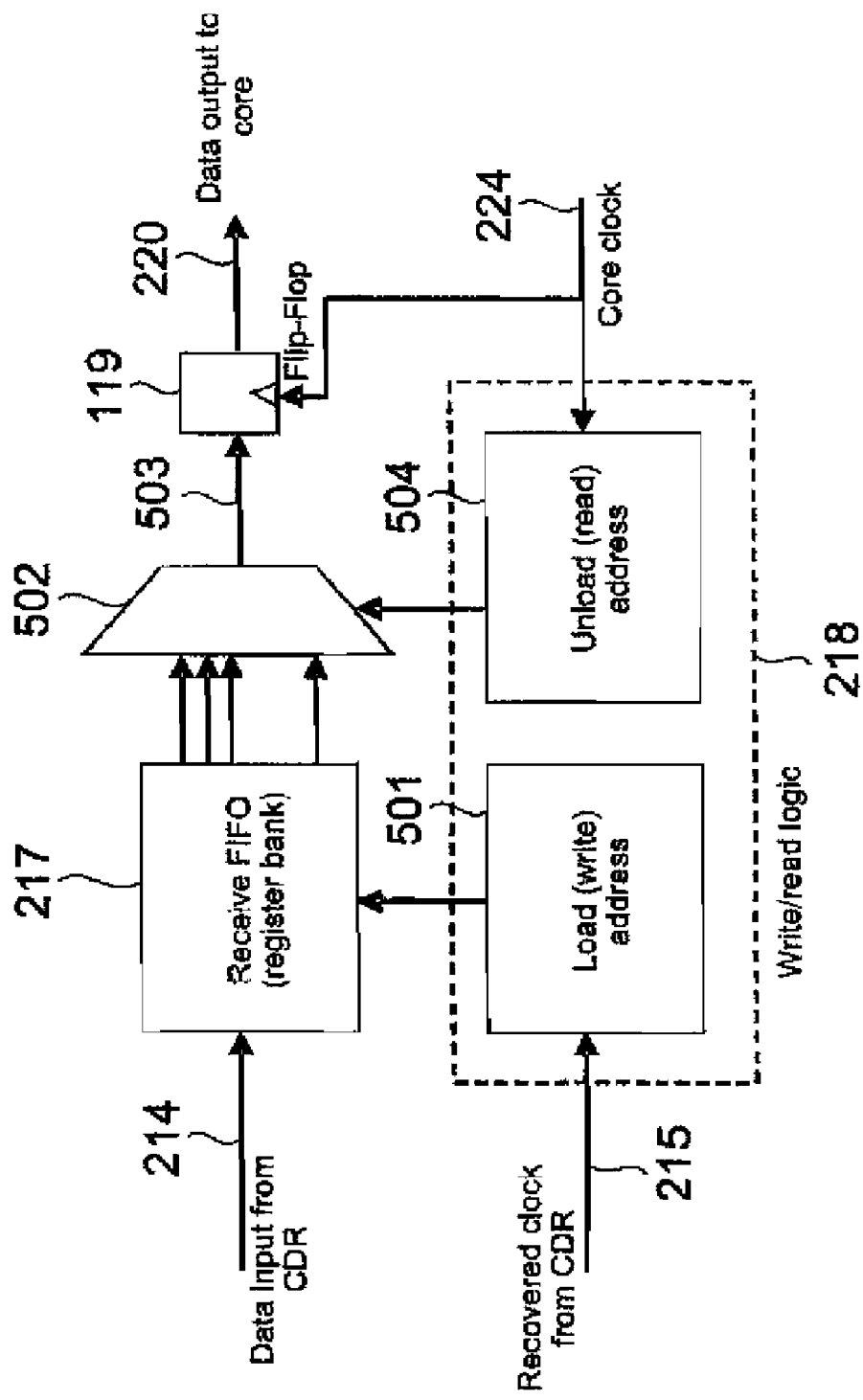
FIG. 5 illustrates a block diagram of a synchronizer according to prior art between the phase of the recovered data and the phase of the core clock.

FIG. 4 describes a second preferred embodiment of the present invention. The forwarded clock signal 108 incident to the serial link port is connected to a first CDR loop 316 comprising a first data receiver frontend 301, a first CDR logic block 302, a first phase position logic 304 and a first phase adjuster 303 to adjust the phase of the clock signal 308 from the core clock generator 222. The local phase update signals 406 of this first CDR loop 316 are connected to a global phase update signals bus 409. The data lanes 107 are incident to their respective second CDR loops 212. Each second CDR loop 212 comprises a second data receiver frontend 211, a second CDR logic block 213, a second phase position logic 410 and a second phase adjuster 209 to adjust the phase of the buffered clock signal 225. The second CDR logic 213 analyzes the phase difference between the input signals of the data receiver frontend 211, and minimizes this phase difference by updating the phase position logic 210 accordingly. The phase position logic 410 is different than the previously described phase position logic in that it can also receive phase update signals 408 from outside the CDR loop. The local phase update signals 407 of the second CDR loops 212 are connected to a global phase update signal bus 409 and the recovered data signals 214 and recovered clock signals 215 are connected to a synchronizer 216 where the dynamic phase difference between the recovered clock signals 215 and the core clock signal 224 is compensated. Each synchronizer 216 comprises a circular FIFO 217, a write/read address logic 218 and a synchronization flip-flop 219. The clock of the synchronization flip-flop 219 is derived from the core clock 224 which is generated in the core clock generator 222 and thereby referenced back to the external reference clock 223.

A global phase update source selection logic block 404 selects which of the local phase update signals 407, 406 are used to be fed back as external phase update signals 408 to the CDR loops 212 and also forwarded as control signals 405 to a digital low-pass function 305 which is controlling a phase position logic 306 to update the phases in the phase adjuster 307. This phase adjuster 307 receives a clock signal 308 from the core clock generator 222 and shifts the phase of this signal by an amount as determined by the phase position logic 306. The selection of phase update signals 407, 405 in the global phase update source selection logic block 404 is controlled by information fed via a control signal 402 to the phase update source selection logic block 404 from a clock analyser 401.

The recovered information of the clock signal 314 and the recovered clock of the clock signal 315 of the first CDR loop 316 which is connected to the forwarded signal lane 108 are fed to a clock analyser 401. This block can for example contain logic that determines that the recovered information of the clock signal 314 consists of a continuous sequence of alternating ones and zeros. If this clock analysis block detects failures in the expected sequence of alternating ones and zeros, it can signal a clock failure indication 403 to the digital core to notify a higher layer protocol of this failure. It would be preferred if a higher-layer protocol would consequently rearrange its signaling scheme in a way where the selected data lane is transmitting a clock signal, but this is not an absolute requirement.

Those skilled in the art will recognize that the forwarded clock signal lane as described in this preferred embodiment is no longer connected to the clock-data-recovery loops 212 via a clock buffer 205 as described in the first preferred embodiment. This enables the clock signal to be a variable waveform not restricted to a consecutive alternating sequence of ones and zeros. In extension to the clock analyser 309 as described in the first preferred embodiment, this clock analyser 401 can therefore analyze the waveform of the clock in much more complex ways. In particular, a well defined set of deviation of the consecutive alternating sequence of ones and zeros can be used to form an out-of-band information signal. For example, the alternating sequence of ones and zeros can be arbitrarily inverted after 32 ones and zeros, each inversion corresponding to a one and zero bit of the out-of-band information stream. This out-of-band information stream can be used for, but not limited to, signaling of status information like adaptive equalization updates, general link status signaling, transmitting amplitude negotiation plus distinction between normal operation and electrical idle state. A transmitter may be built that may generate such signals.

With the approach outlined in this second preferred embodiment according to the present invention, the output clock of the phase adjuster 307 is phase locked to the phase of the incident clock lane 108 to minimize the dynamic phase variation between the core clock output signal 224 and the phase of the incident clock signal 107 to minimize the number of phase compensating stages in the FIFO 217 of a synchronizer 216, thereby greatly reducing the latency of the serial link transmission system. An alternate core clock output 312 is provided to the digital core 103 to ensure the availability of a clock signal in case of a failure of the above described function. With this preferred embodiment of the present invention, it is also possible to convert an incident data lane 107 into the role of the forwarded clock signal lane 108 without an analog multiplexer 202, thereby reducing design complexity.

The present invention results in several advantages. First, latency of the serial link transmission system is reduced because the read clock incident to the synchronizer and the recovered clock incident to the synchronizer are phase locked on-chip where the overall drift effects are relatively smaller and relatively more controllable in comparison to in the distribution paths of the reference clocks.

Second, the detection of a clock failure is relatively simplified because this detection can be implemented in digital form. Third, the conversion of a data lane into the role of the forwarded clock signal lane via digital circuitry is enabled without an analog multiplexer, therefore reducing design complexity. Fourth, analysis of the quality of the forwarded clock signal is relatively simplified by enabling quality analysis by means of a simple logic function instead of a complicated analog circuitry, thereby reducing design complexity and enhancing testability. Finally, a receiver of a serial link port is enabled to detect out-of-band information transmitted via a variable clock waveform, thereby enabling signaling of status information like adaptive equalization updates, general link status signaling, transmit amplitude negotiation plus distinction between normal operation and electrical idle state.

Alternatives to various elements of the invention are envisaged. For example, the clock generator 222 may be an oscillator, a PLL, a DLL or one or a plurality of clock buffers driven from an external reference clock. Further, the digitally controlled slave phase adjuster 307 to adjust the phase of said clock generator 222 may be a phase interpolator, a phase selector, a phase rotator, a DLL, a variable delay line, or an analog multiplier. Also, the synchronizer may comprise a daisy chain connection of synchronization flip-flops, a shift register, a register bank, a FIFO, a circular FIFO or a dual port RAM. The present system may be used for data transmission having non-return-to-zero modulation, duo-binary modulation, pulse amplitude modulation, or multi level data modulation. Furthermore, the present system may be used for synchronous, plesiochronous, or asynchronous data transmission links.

Having illustrated and described preferred embodiments for a novel method and apparatus for handling of clock information in serial link ports, it is noted that variations and modifications in the method and the apparatus can be made without departing from the scope of the invention.

The invention claimed is:

1. Receiver apparatus for a serial link, comprising:
a first clock-data-recovery loop having a digitally controlled phase adjuster comprising recovery means to recover data and a clock signal, and generation means to generate information about a phase difference between an input phase signal and a clock phase signal;
a clock generator having a digitally controlled second phase adjuster to adjust a phase of said clock generator;
a distributor to distribute phase difference information in digital form between said first clock-data-recovery loop and said digitally controlled second phase adjuster of said clock generator;
a synchronizer to transfer recovered data to a clock domain with a clock derived from said digitally controlled second phase adjuster of said clock generator; and
wherein said clock signal is a variable waveform and wherein variations in a clock signal waveform carry out of band information.

2. The receiver according to claim 1, having at least one second clock-data-recovery loop connected to at least one data lane.

3. The receiver according to claim 2, having at least one synchronizer, each synchronizer connected to one of said at least one second clock-data-recovery loop.

4. The receiver according to claim 3, wherein said first clock-data-recovery loop is connected to a clock lane by one of a direct connection and an indirect connection.

5. The receiver according to claim 2, wherein said distributor comprises one or a plurality of wires carrying digital signals.

6. The receiver according to claim 5, wherein said distributor further comprises a digital filter, wherein said digital filter is connected along at least one wire between said first clock-data-recovery loop and said second phase adjuster of said clock generator.

7. The receiver according to claim 5, wherein said distributor further comprises a digital filter, wherein said digital filter is connected along at least one wire between said first clock-data-recovery loop and all said at least one second clock-data-recovery loops.

8. The receiver according to claim 1, wherein an output clock from said second phase adjuster of said clock generator is used to control at least one of a clock of a data transmitter and a clock of a digital core.

9. The receiver according to claim 8, wherein said digitally controlled second phase adjuster of said clock generator is located at an output of said clock generator.

10. The receiver according to claim 8, wherein said digitally controlled second phase adjuster of said clock generator is located in a feedback loop within said clock generator.

11. The receiver according to claim 1, wherein an output of said first clock-data-recovery loop is input to a clock analyzer.

12. The receiver according to claim 11, wherein said clock analyzer determines quality of the clock signal as recovered by said first clock-data-recovery loop.

13. The receiver according to claim 1, wherein said out-of-band information is used to signal at least one of status information, a synchronization completed indication, power ok indication, equalization information, signal amplitude negotiation information, information used for link mode switching such as electrical idle indication, power-down indication, sleep mode indication.

14. The receiver according to claim 13, wherein an output of said first clock-data-recovery loop is fed to a detector for detecting said out-of-band information.

15. The receiver according to claim 14, wherein said detected out-of-band information is used in said serial link receiver, or forwarded directly or after processing to a data transmitter or to a digital core.

16. A method for handling of clock information in a receiver of a serial link, the method comprising the steps of:
recovering data and a clock signal via a first clock-data-recovery loop having a digitally controlled phase adjuster;
generating information about a phase difference between an input phase and a clock phase;
adjusting a phase of a clock generator having a digitally controlled second phase adjuster;

distributing said phase difference information in digital form between said first clock-data-recovery loop and said digitally controlled phase adjuster of said clock generator;

transferring said recovered data to a clock domain with a clock derived from said digitally controlled phase adjuster of said clock generator; and wherein said clock signal is a variable waveform and wherein variations in a clock signal waveform carry out of band information.

17. A serial data transmission link system having at least one receiver comprising:

a first clock-data-recovery loop having a digitally controlled phase adjuster comprising recovery means to recover data and a clock signal, and generation means to generate information about a phase difference between an input phase signal and a clock phase signal;

a clock generator having a digitally controlled second phase adjuster to adjust a phase of said clock generator;

a distributor to distribute phase difference information in digital form between said first clock-data-recovery loop and said digitally controlled second phase adjuster of said clock generator;

a synchronizer to transfer recovered data to a clock domain with a clock derived from said digitally controlled second phase adjuster of said clock generator; and wherein said clock signal is a variable waveform and wherein variations in a clock signal waveform carry out of band information.

18. Data transmission link system comprising two or more serial link transmission systems as set forth in claim 17 connected in one of daisy chain, full-duplex, half-duplex and simultaneous bidirectional configuration to transmit data between microprocessor chips.

19. A serial data transmission link system having a plurality of data lanes plus a forwarded clock signal lane each having a receiver comprising:

a first clock-data-recovery loop having a digitally controlled phase adjuster comprising recovery means to recover data and a clock signal, and generation means to generate information about a phase difference between an input phase signal and a clock phase signal;

a clock generator having a digitally controlled second phase adjuster to adjust a phase of said clock generator;

a distributor to distribute phase difference information in digital form between said first clock-data- recovery loop and said digitally controlled second phase adjuster of said clock generator;

a synchronizer to transfer recovered data to a clock domain with a clock derived from said digitally controlled second phase adjuster of said clock generator; and wherein said clock signal is a variable waveform and wherein variations in a clock signal waveform carry out of band information.

* * * * *